US012643606B2

(12) United States Patent
Mirbeygi Moghaddam et al.

(10) Patent No.: US 12,643,606 B2
(45) Date of Patent: Jun. 2, 2026

(54) VEHICLE CONTROL SYSTEMS FOR AUTOMATED VEHICLE STEERING

(71) Applicant: GM GLOBAL TECHNOLOGY OPERATIONS LLC, Detroit, MI (US)

(72) Inventors: Amirreza Mirbeygi Moghaddam, Toronto (CA); Ben Maccallum, Toronto (CA); Reza Zarringhalam, Whitby (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 46 days.

(21) Appl. No.: 18/752,379

(22) Filed: Jun. 24, 2024

(65) Prior Publication Data

US 2025/0388264 A1 Dec. 25, 2025

(51) Int. Cl.
B62D 15/02 (2006.01)

(52) U.S. Cl.
CPC .................................. B62D 15/025 (2013.01)

(58) Field of Classification Search
CPC ..... B60W 30/10; B60W 30/12; B62D 15/025; B62D 15/0255
See application file for complete search history.

(56) References Cited

U.S. PATENT DOCUMENTS 10,514,457 B2 * 12/2019 Talamonti .............. B60K 35/23

FOREIGN PATENT DOCUMENTS

| | | |
|---|---|---|
| DE | 102021129878 A1 | 9/2022 |
| WO | WO-2020187462 A1 | 9/2020 |

OTHER PUBLICATIONS

German Office Action from counterpart DE1020241229063, dated Mar. 24, 2025.

* cited by examiner

*Primary Examiner* — Mark L. Greene

(57) ABSTRACT

An example vehicle control system for automated vehicle steering includes a vehicle control module configured to determine a vehicle merge path based at least in part on images captured by a vehicle camera, the vehicle merge path configured to steer the vehicle to a specified target vehicle path, obtain multiple vehicle error dynamic values with respect to the specified target vehicle path, identify first and second path boundaries based on the multiple vehicle error dynamic values and first and second steering gain parameter values, determine a dynamically feasible vehicle path envelope according to the path boundaries, compare the vehicle merge path to the dynamically feasible vehicle path envelope, and modify automated control of the steering angle of the vehicle in response to the vehicle merge path being outside of the dynamically feasible vehicle path envelope.

20 Claims, 5 Drawing Sheets

VEHICLE CONTROL SYSTEMS FOR AUTOMATED VEHICLE STEERING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure generally relates to vehicle control systems for automated vehicle steering, including determination of dynamically feasible vehicle path envelopes.

Some vehicles include automated driving systems, which may provide automated steering control configured to adjust steering of a vehicle to move the vehicle to a specified target path (such as a lane change operation or center lane assist function).

SUMMARY

An example vehicle control system for automated vehicle steering includes an automated steering device configured to automatically adjust a steering angle of a vehicle, at least one vehicle camera configured to capture an image of a front view from a vehicle, and a vehicle control module configured to determine a vehicle merge path based at least in part on one or more images captured by the vehicle camera, the vehicle merge path configured to steer the vehicle to a specified target vehicle path, obtain multiple vehicle error dynamic values with respect to the specified target vehicle path, identify a first path boundary based on the multiple vehicle error dynamic values and a first steering gain parameter value, identify a second path boundary based on the multiple vehicle error dynamic values and a second steering gain parameter value, wherein the second steering gain parameter value is less than the first steering gain parameter value, determine a dynamically feasible vehicle path envelope according to the first path boundary and the second path boundary, compare the vehicle merge path to the dynamically feasible vehicle path envelope, and modify automated control of the steering angle of the vehicle in response to the vehicle merge path being outside of the dynamically feasible vehicle path envelope.

In some examples, modifying automated control of the steering angle of the vehicle includes at least one of mechanically rotating a steering column of the vehicle and mechanically changing a steering orientation of wheels of the vehicle.

In some examples, the vehicle control module is configured to maintain automated control of the steering angle of the vehicle along he vehicle merge path, in response to the vehicle merge path being outside of the dynamically feasible vehicle path envelope.

In some examples, modifying automated control of the steering angle of the vehicle includes recalculating an updated vehicle merge path.

In some examples, modifying automated control of the steering angle of the vehicle includes setting an updated vehicle merge path within the dynamically feasible vehicle path envelope.

In some examples, the vehicle merge path is one of the first path boundary and the second path boundary.

In some examples, the vehicle control module is configured to identify the first path boundary and the second path boundary based on calculation of a set of steering angle values along a finite horizon, according to the multiple vehicle error dynamic values.

In some examples, the multiple vehicle error dynamic values include at least one of a vehicle lateral movement parameter, a vehicle yaw rate parameter, or a vehicle path offset parameter.

In some examples, the vehicle control module is configured to execute at least one model predictive controller (MPC) objective function to generate the specified target vehicle path.

In some examples, the vehicle control module is configured to supply states of the dynamically feasible vehicle path envelope as reference values for each output of the at least one model predictive controller (MPC) objective function.

In some examples, the specified target vehicle path is a lane assist target path configured to control an automated lane merge of the vehicle.

An example method of controlling automated vehicle steering includes determining a vehicle merge path of a vehicle based at least in part on one or more images captured by a vehicle camera, the vehicle merge path configured to steer the vehicle to a specified target vehicle path, obtaining multiple vehicle error dynamic values with respect to the specified target vehicle path, identifying a first path boundary based on the multiple vehicle error dynamic values and a first steering gain parameter value, identifying a second path boundary based on the multiple vehicle error dynamic values and a second steering gain parameter value, wherein the second steering gain parameter value is less than the first steering gain parameter value, determining a dynamically feasible vehicle path envelope according to the first path boundary and the second path boundary, comparing the vehicle merge path to the dynamically feasible vehicle path envelope, and modifying automated control of a steering angle of the vehicle in response to the vehicle merge path being outside of the dynamically feasible vehicle path envelope.

In some examples, modifying automated control of the steering angle of the vehicle includes at least one of mechanically rotating a steering column of the vehicle and mechanically changing a steering orientation of wheels of the vehicle.

In some examples, the method includes maintaining automated control of the steering angle of the vehicle along the vehicle merge path, in response to the vehicle merge path being outside of the dynamically feasible vehicle path envelope.

In some examples, modifying automated control of the steering angle of the vehicle includes recalculating an updated vehicle merge path.

In some examples, modifying automated control of the steering angle of the vehicle includes setting an updated vehicle merge path within the dynamically feasible vehicle path envelope.

In some examples, the updated vehicle merge path is one of the first path boundary and the second path boundary.

In some examples, identification of the first path boundary and the second path boundary is based on calculation of a set of steering angle values along a finite horizon, according to the multiple vehicle error dynamic values.

In some examples, the multiple vehicle error dynamic values include at least one of a vehicle lateral movement parameter, a vehicle yaw rate parameter, or a vehicle path offset parameter.

In some examples, the method includes executing at least one model predictive controller (MPC) objective function to generate the vehicle merge path.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Some example embodiments described herein provide a novel method of generating a dynamically feasible control envelope for lateral trajectory control of a vehicle during an automated steering maneuver. This envelope may be constructed using error dynamics of the vehicle with respect to a target path (e.g., a center of a driving lane).

Based on the error states and feedback-based control, a set of steering angle values are calculated along a finite horizon, thereby producing a dynamically feasible envelope which converges to the target path. The states of the dynamically feasible path may be provided as reference values for each of the outputs in an objective function, to facilitate or guarantee that the output references are dynamically feasible and mutually achievable. The envelope may also be provided as feedback to a vehicle path planner, to modify the trajectory if a model predictive controller (MPC) determines infeasibility of the planned trajectory.

In some examples, an automated vehicle steering method ensures feasibility of trajectory tracking in model-predictive lateral control applications for a vehicle, using desired error dynamics calculated based on a desired vehicle steering control response in transient and steady state. Dynamic feedback from control to vehicle path planning may be used to recalculate a vehicle merge path, if the initial generated trajectory is not feasible for the vehicle control module to follow.

Some example embodiments may provide a fail-operational mechanism to follow a most feasible path, if the initially planned vehicle trajectory violates control feasibility. The desired error dynamics may be generated based on the feasible path envelope, which may facilitate or assure feasibility in dynamic tracing of a geometric path, with physical constraint considerations.

For example, feasible optimal path tracking may be implemented using a model predictive controller, to maintain, e.g., lane following even in the event of an erroneous or non-achievable initial planned vehicle path. Example methods may incorporate physical limitations of the vehicle in tracing of the geometric path.

Figure 1:
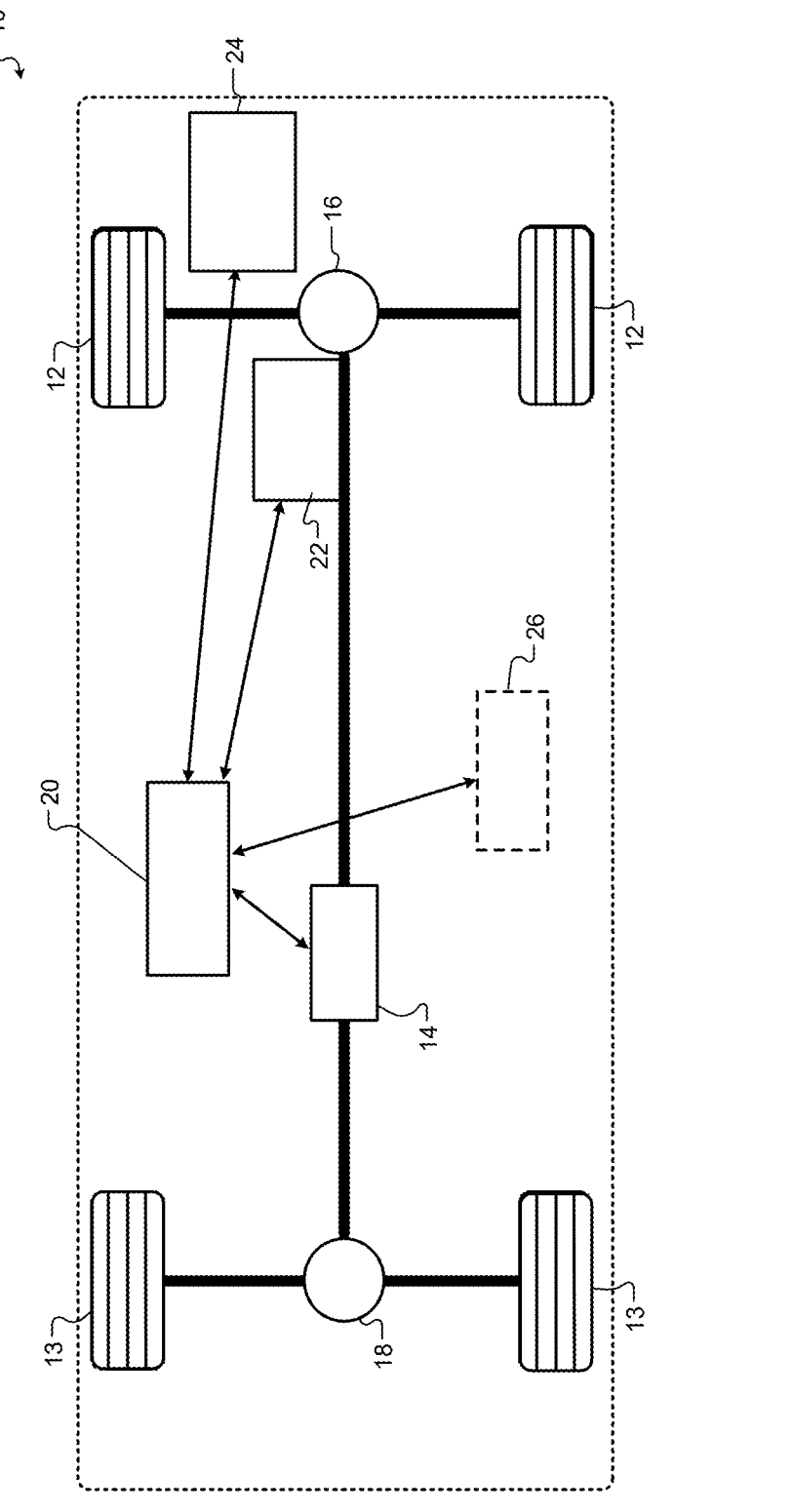
FIG. 1 is a functional block diagram of an example embodiment of a vehicle including a control system for automated vehicle steering control.

Referring now to FIG. 1, a vehicle 10 includes front wheels 12 and rear wheels 13. In FIG. 1, a drive unit 14 selectively outputs torque to the front wheels 12 and/or the rear wheels 13 via drive lines 16, 18, respectively. The vehicle 10 may include different types of drive units. For example, the vehicle may be an electric vehicle such as a battery electric vehicle (BEV), a hybrid vehicle, or a fuel cell vehicle, a vehicle including an internal combustion engine (ICE), or other type of vehicle.

Some examples of the drive unit 14 may include any suitable electric motor, a power inverter, and a motor controller configured to control power switches within the power inverter to adjust the motor speed and torque during propulsion and/or regeneration. A battery system provides power to or receives power from the electric motor of the drive unit 14 via the power inverter during propulsion or regeneration.

While the vehicle 10 includes one drive unit 14 in FIG. 1, the vehicle 10 may have other configurations. For example, two separate drive units may drive the front wheels 12 and the rear wheels 13, one or more individual drive units may drive individual wheels, etc. As can be appreciated, other vehicle configurations and/or drive units can be used.

The vehicle control module 20 may be configured to control operation of one or more vehicle components, such as the drive unit 14 (e.g., by commanding torque settings of an electric motor of the drive unit 14). The vehicle control module 20 may receive inputs for controlling components of the vehicle, such as signals received from a steering wheel, an acceleration paddle, etc. The vehicle control module 20 may monitor telematics of the vehicle for safety purposes, such as vehicle speed, vehicle location, vehicle braking and acceleration, etc.

The vehicle control module 20 may receive signals from any suitable components for monitoring one or more aspects of the vehicle, including one or more vehicle sensors (such as cameras, microphones, pressure sensors, wheel position sensors, location sensors such as global positioning system (GPS) antennas, etc.). Some sensors may be configured to monitor current motion of the vehicle, acceleration of the vehicle, steering torque, etc.

As shown in FIG. 1, the vehicle 10 includes a front vehicle camera 24 and an optional side vehicle camera 26. In various implementations, the vehicle 10 may include more or less of any one of these vehicle cameras (such as a rear vehicle camera, etc.). Each vehicle camera may include any suitable camera, laser, lidar sensor, etc., which is used to capture images around the vehicle 10 (such as a front vehicle camera image depicting a scene in front of the vehicle, etc.). In some example embodiments, a vehicle object detector may be configured to detect a closest in-path vehicle (CIPV) (e.g., another vehicle in front of a current driving path of the vehicle 10), a vulnerable road user (VRU) (e.g., a pedestrian or cyclist), etc.

The front vehicle camera 24 and/or side vehicle camera 26 may be used to assist in automated steering control of the vehicle 10. For example, the vehicle 10 may include an automated steering device 22, which provides automated steering control of the vehicle 10 according to, e.g., a target vehicle path or vehicle merge path. For example, the automated steering device 22 may include an actuator, a rotational gear, etc. The automated steering device 22 may be configured to mechanically adjust a rotational position of a steering column, mechanically adjust a steering orientation of one or more wheels of the vehicle 10, etc.

In some examples, the vehicle control module 20 may be configured to determine a vehicle merge path based on images captured by the front vehicle camera 24 and/or side vehicle camera 26, such as an automated lane change vehicle path or center lane assist vehicle path. The vehicle control module 20 may then control the automated steering device 22 to control a steering angle of the vehicle 10 along the target vehicle path or vehicle merge path.

The vehicle control module 20 may communicate with another device via a wireless communication interface, which may include one or more wireless antennas for transmitting and/or receiving wireless communication signals. For example, the wireless communication interface may communicate via any suitable wireless communication protocols, including but not limited to vehicle-to-everything (V2X) communication, Wi-Fi communication, wireless area network (WAN) communication, cellular communication, personal area network (PAN) communication, short-range wireless communication (e.g., Bluetooth), etc. The wireless communication interface may communicate with a remote computing device over one or more wireless and/or wired networks. Regarding the vehicle-to-vehicle (V2X) communication, the vehicle 10 may include one or more V2X transceivers (e.g., V2X signal transmission and/or reception antennas).

Figure 2:
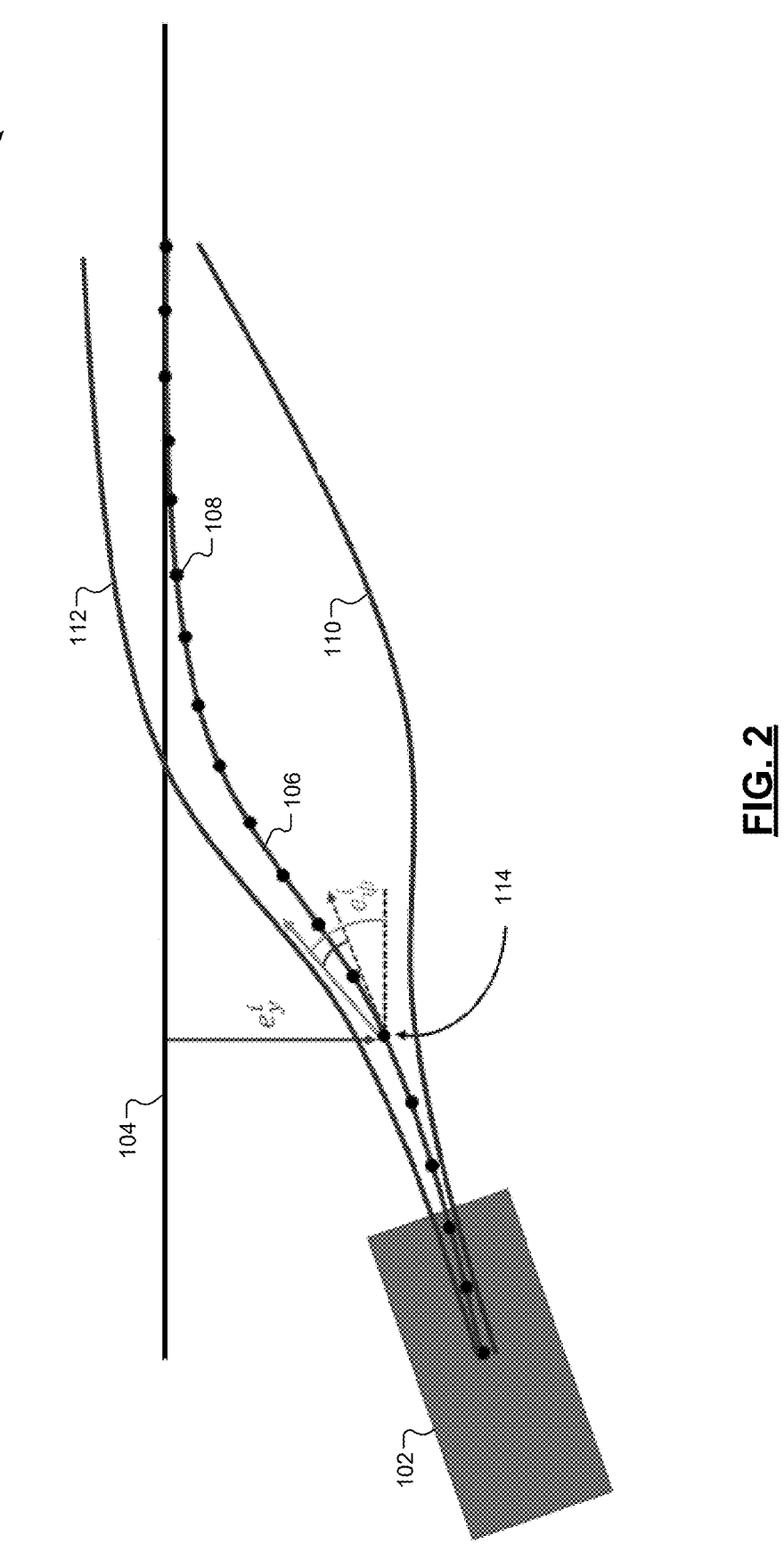
FIG. 2 is a line drawings illustrating an example target vehicle path and boundaries of an example dynamically feasible vehicle path envelope.

FIG. 2 is a line drawings illustrating an example target vehicle path and boundaries of an example dynamically feasible vehicle path envelope. In the automated steering control system 100 of FIG. 2, a target path 104 for a vehicle 102 is specified, such as an automated lane merge function, an automated center lane assist steering function, etc.

For example, a merge path 106 (e.g., a blend path (BP)) may be calculated in order to automatically steer the vehicle 102 form a current trajectory to the target path 104 over a time period. The merge path 106 may include multiple states 108 each calculated for different points it time, to move the vehicle 102 to the target path 104 over a period of time.

As shown in FIG. 2, the vehicle control module may be configured to determine a dynamically feasible control envelope including a first boundary 112 and a second boundary 110. The dynamically feasible control envelope may be determined by comparing error dynamics of the vehicle 102 with the target path 104, at one or more error calculation points 114, which may be located along the merge path 106.

Some example equations for determining vehicle error dynamics for a blend path (BP) compared to a specified target vehicle path (e.g., a reference path) are provided below:

$$e = \begin{bmatrix} e_y \\ e_{V_y} \\ e_\psi \\ e_{\omega_z} \end{bmatrix} = \begin{bmatrix} y^{BP} \\ V_y^{BP} \\ \psi^{BP} \\ \omega_z^{BP} \end{bmatrix} - \begin{bmatrix} y^{ref} \\ V_y^{ref} \\ \psi^{ref} \\ \omega_z^{ref} \end{bmatrix}$$

$$\dot{e} = Ae + B_1 \delta_f + B_2(\phi_r)$$

$$\delta_f = -Ke$$

Tuning the 'K' gain value may affect the shape of the feasible path envelope, where higher K gains correspond to sharper steering angles (such as the first boundary 112).

Lower K gains correspond to more gradual steering angles (such as the second boundary 110.

For example, the vehicle control module may be configured to determine a lateral movement error parameter (y), a yaw rate error parameter (V), a path offset error parameter (Ψ), a heading angle error parameter (ω), etc., at one or more error calculation points 114. BP represents blend path (e.g., merge path) parameters, e represents error states, δf represents a front steering angle, and K represents a gain for the steering angle into the feasible path envelope. An example equation for determining parameters at the point 114 is provided below:

$$\begin{bmatrix} y^{BP,i} \\ V_y^{BP,i} \\ \psi^{BP,i} \\ \omega_z^{BP,i} \end{bmatrix}, \delta_f^{BP,i} = -K|_{\rho_i, V_x} e_i$$

The vehicle control module may then determine whether the merge path 106 lies within the first boundary 112 and the second boundary 110 (e.g., within a feasible control envelope), to determine whether the current merge path 106 is acceptable or if it needs to be recalculated or updated. Further example details for calculating the feasible control envelope and associated boundaries are described further below.

Figure 3:
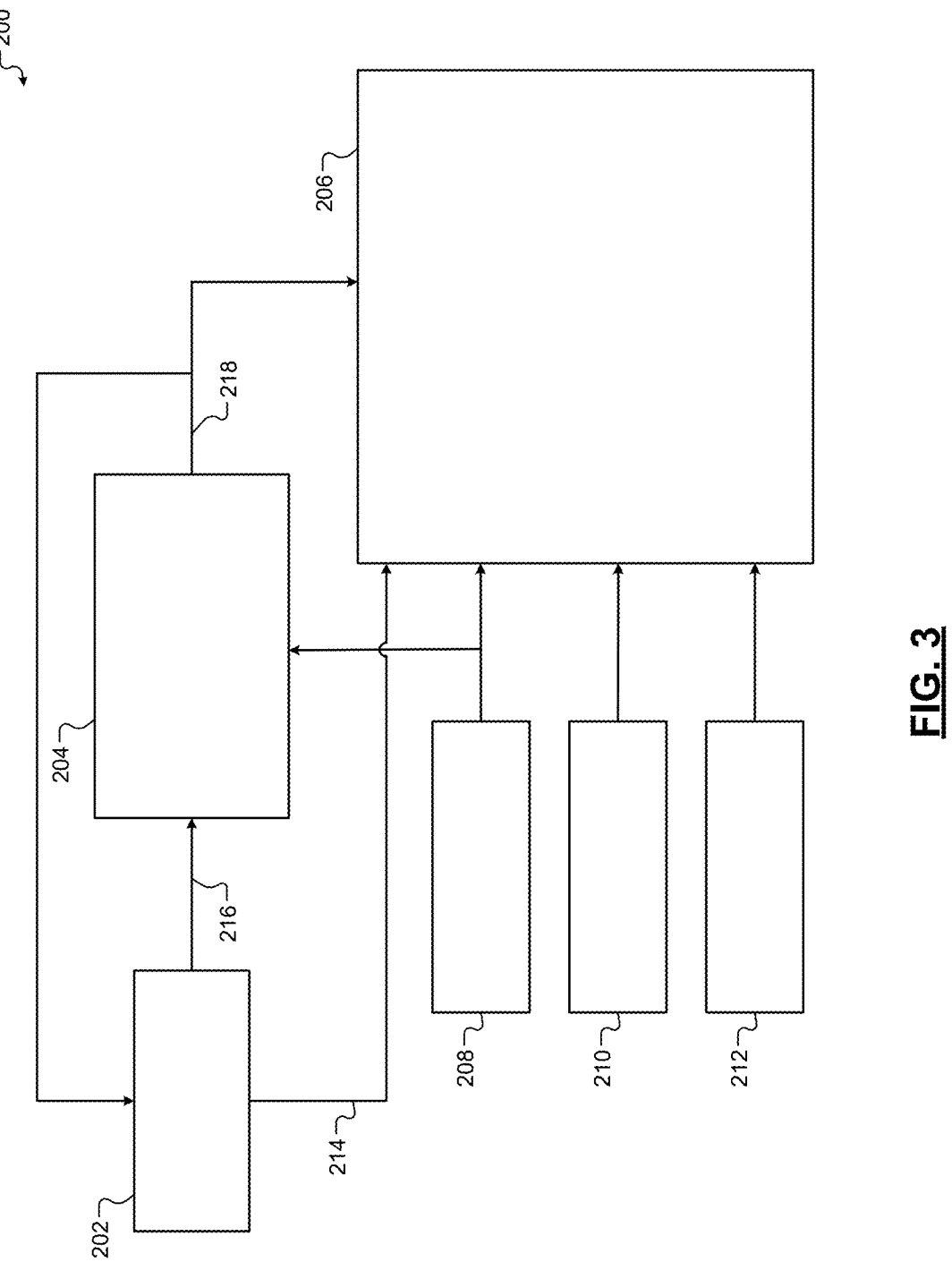
FIG. 3 is a functional block diagram of example components of a vehicle control system for automated vehicle steering control.

FIG. 3 is a functional block diagram of example components of a vehicle control system 200 for automated vehicle steering control. A vehicle path planner 202 determines an initial merge path for steering the vehicle to a specified target vehicle path. A trajectory of the merge path may be provided to a model predictive controller (MPC) 206 as a planned trajectory 214, in order to control automated steering of the vehicle. The trajectory of the merge path may be provided to the feasible envelope determination module 204 as a reference trajectory 216.

The feasible envelope determination module 204 calculates a dynamically feasible path envelope 218, which is supplied to the model predictive controller 206. The feasible path envelope 218 may also be fed back to the vehicle path planner 202, in case a new merge path needs to be generated.

The model predictive controller (MPC) 206 may be configured to control automated steering of the vehicle along a merge path, to steer the vehicle to a target vehicle path. In some examples, the model predictive controller (MPC) may receive parameters from a vehicle plant model 208, from adaptive vehicle weights 210 (e.g., a prediction horizon, a control horizon, output weights, input weights, input rate weights, etc.), and constraints 212. The constraints may include any suitable parameters for constraining movement of the vehicle, such as for vehicle safety, to avoid a negative driving experience for a passenger based on excessive vehicle motion, etc.

As another example, an equation for a target lane error dynamic is:

$$\dot{e} = Ae + B\_1\delta + B\_2\kappa d + B\_3 \sin\phi r, \text{ where}$$

$$A = \begin{bmatrix} 0 & 1 & 0 & 0 \\ 0 & -\dfrac{C_f + C_r}{mV_x} & \dfrac{C_f + C_r}{m} & \dfrac{-C_f l_f + C_r l_r}{mV_x} \\ 0 & 0 & 0 & 1 \\ 0 & -\dfrac{C_f l_f + C_r l_r}{I_z V_x} & \dfrac{C_f l_f + C_r l_r}{I_z} & -\dfrac{C_f l_f^2 + C_r l_r^2}{I_z V_x} \end{bmatrix} \text{ and}$$

-continued $$
B_1 = \begin{bmatrix} 0 \\ \dfrac{C_f}{m} \\ 0 \\ \dfrac{C_f l_f}{I_z} \end{bmatrix} \quad B_2 = \begin{bmatrix} 0 \\ -\dfrac{C_f l_f + C_r l_r}{m} - V_x^2 \\ 0 \\ -\dfrac{C_f l_f^2 + C_r l_r^2}{I_z} \end{bmatrix} \quad B_3 = \begin{bmatrix} 0 \\ -g \\ 0 \\ 0 \end{bmatrix}
$$

Assuming $\delta$ is an optimal solution from an MPC, an immediate non-constrained solution can be replicated via SVF as $\delta = -K^*e$. This changes the error dynamics to $e=(A-K B\_1)e$. An example equation for constructing a feasible path in view of the above is:

$$
\frac{d}{dt}\begin{bmatrix} y \\ V_y \\ \psi \\ \dot{\psi} \end{bmatrix} =
$$

$$
\begin{bmatrix} 0 & 1 & V_x & 0 \\ 0 & -\dfrac{C_f + C_r}{m V_x} & 0 & -V_x - \dfrac{C_f l_f + C_r l_r}{m V_x} \\ 0 & 0 & 0 & 1 \\ 0 & -\dfrac{C_f l_f + C_r l_r}{I_z V_x} & 0 & -\dfrac{C_f l_f^2 + C_r l_r^2}{I_z V_x} \end{bmatrix} \begin{bmatrix} y \\ V_y \\ \psi \\ \dot{\psi} \end{bmatrix} + \begin{bmatrix} 0 \\ \dfrac{C_f}{m} \\ 0 \\ \dfrac{C_f l_f}{I_z} \end{bmatrix} \delta - \begin{bmatrix} 0 \\ g \\ 0 \\ 0 \end{bmatrix} \sin\phi_r
$$

Figure 4:
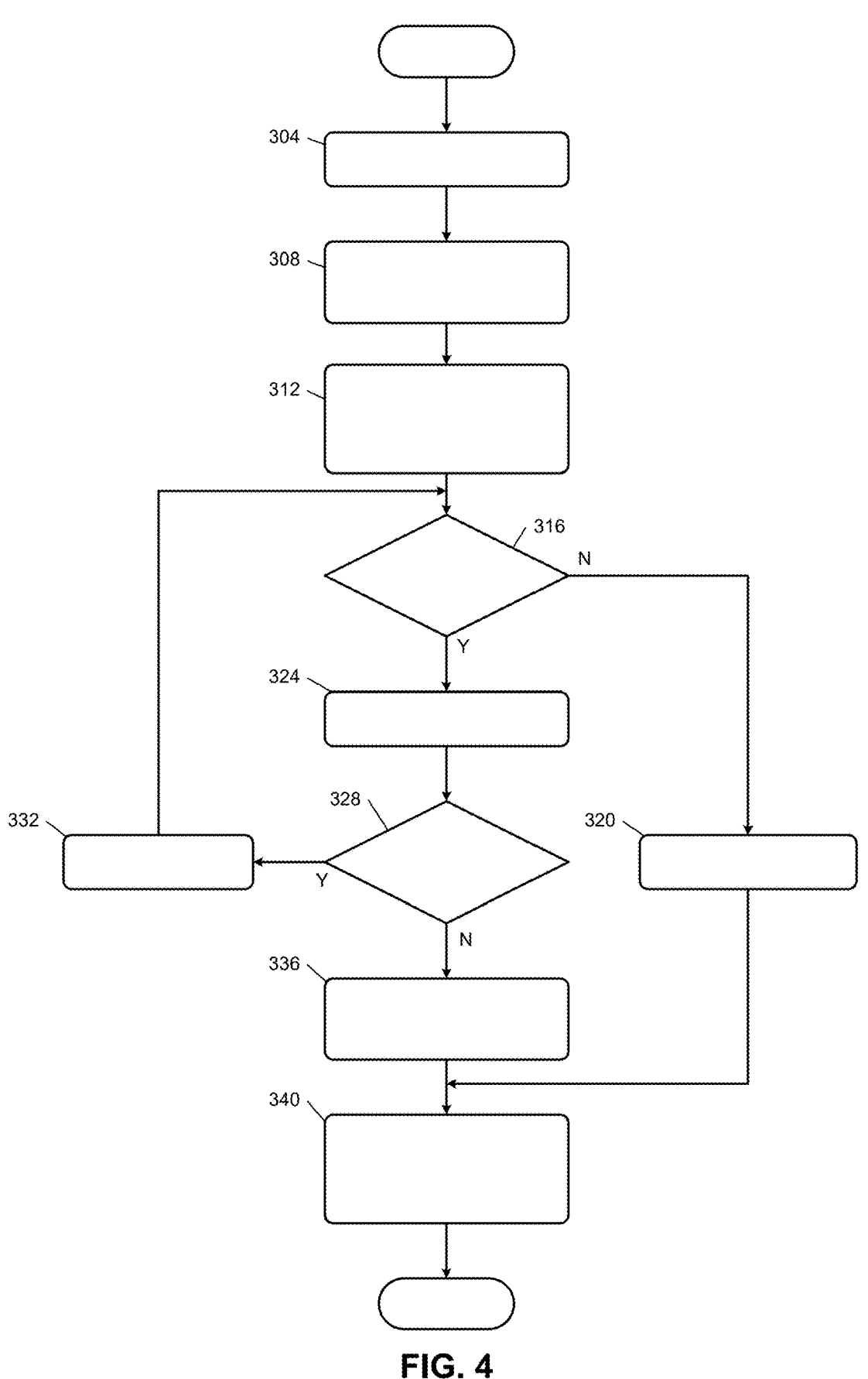
FIG. 4 is a flowchart depicting an example process for automated vehicle steering control based on a dynamically feasible vehicle path envelope.

FIG. 4 is a flowchart depicting an example process for automated vehicle steering control based on a dynamically feasible vehicle path envelope. The process may be performed by, for example, the vehicle control module 20 of FIG. 1. At 304, the method begins by obtaining a vehicle merge path. For example, a vehicle merge path may be generated based at least in part on an image captured from a front vehicle camera, such as the front vehicle camera 24 of the vehicle 10 in FIG. 1. The vehicle merge path may be configured to steer the vehicle towards a specified target vehicle path, such as a lane merge, a center lane assist, etc. Although some example embodiments refer to images captured by a front vehicle camera, in some implementations images may be captured by a side vehicle camera, by a combination of one or more front and side vehicle cameras, etc.

At 308, the vehicle control module is configured to obtain a dynamically feasible vehicle path envelope. For example, the vehicle control module may calculate feasible path boundaries based on error dynamics of the vehicle and one or more constraints, to define a dynamically feasible vehicle path envelope. The dynamically feasible vehicle path envelope may include a first boundary considered as a most aggressive feasible vehicle path (e.g., a vehicle path having a sharpest allowable steering angle), and a second boundary considered as a least aggressive feasible vehicle path (e.g., a vehicle path having a most gradual allowable steering angle without exceeding a desirable time period to complete a steering maneuver). Further details of determining the dynamically feasible vehicle path envelope are discussed further below with reference to FIG. 5.

At 312, control compares the vehicle merge path to the dynamically feasible vehicle path envelope. For example, control may determine whether a current vehicle merge path lies within acceptable boundaries of the dynamically feasible path envelope, or whether the current vehicle merge path is outside of the envelope boundaries (e.g., indicative that the current vehicle merge path has a steering angle that is too aggressive or too gradual).

If the vehicle merge path is within the dynamically feasible envelope at 316, then control maintains the current vehicle merge path at 320 (e.g., because control has determined that the current vehicle merge path has an acceptable degree of steering angle). If the vehicle merge path is outside of the dynamically feasible envelope at 316, control checks a path recalculation preference setting at 324.

For example, the system may specify whether a new vehicle merge path should be calculated in response to a current vehicle path exceeding the envelope boundaries, whether the current vehicle path should be updated to lie within the envelope boundaries (such as being set at one of the envelope boundaries, etc.). If a path recalculation preference is set at 328, control proceeds to 332 to recalculate the vehicle merge path.

In some examples, the vehicle control module may calculate a new vehicle merge path, which may be based on capturing new images from a vehicle camera, may or may not include calculation based on data from the dynamically feasible vehicle path envelope or boundaries, etc. Control then returns to 320 to check whether the recalculated vehicle merge path lies within the dynamically feasible vehicle path envelope. This process may be repeated until a vehicle path is recalculated which lies within the dynamically feasible vehicle path envelope.

If a recalculation preference is not set at 328, or a dynamically feasible envelope preference is set at 328, control proceeds to 336 to set a vehicle merge path within the boundaries of the dynamically feasible envelope at 336. For example, control may update the vehicle merge path to a path along one of the boundaries of the envelope, to a path inside the boundaries of the envelope (such as a middle of the envelope), etc.

At 340, the vehicle control module is configured to automatically control a vehicle steering angle according to the vehicle merge path, which may include the initially set vehicle merge path, a recalculated vehicle merge path, an updated vehicle merge path set based on the dynamically feasible vehicle path envelope (e.g., based on a boundary on the envelope), etc. For example, control may adjust an actuator, a rotational gear, etc., to mechanically modify a steering angle of a steering column, to mechanically adjust a steering orientation of wheels of the vehicle, etc.

Figure 5:
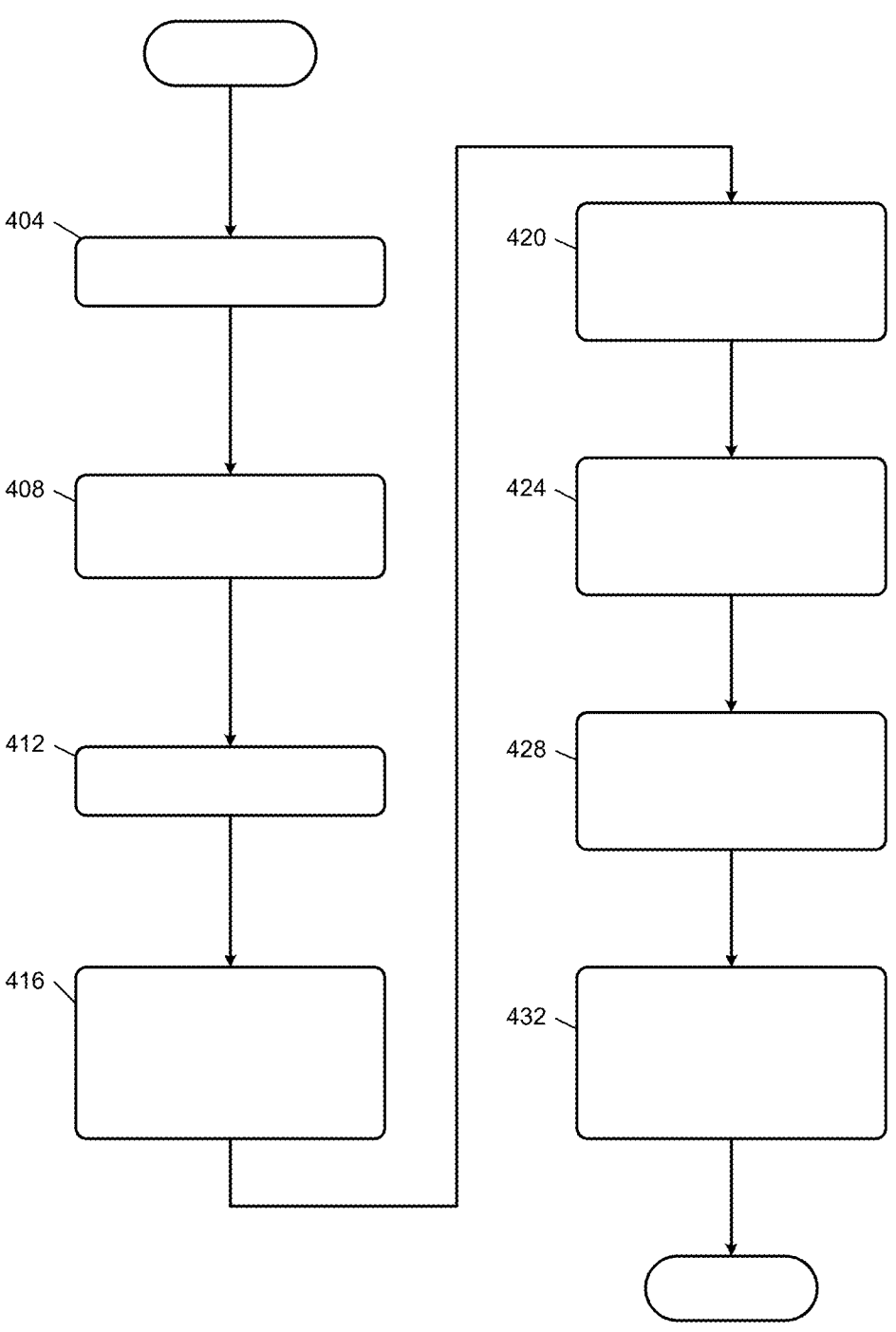
FIG. 5 is a flowchart depicting an example process for determining a dynamically feasible vehicle path envelope.

FIG. 5 is a flowchart depicting an example process for determining a dynamically feasible vehicle path envelope. The process may be performed by, for example, the vehicle control module 20 of FIG. 1. At 404, the method begins by obtaining a vehicle merge path. For example, a vehicle merge path may be generated based at least in part on an image captured from a front vehicle camera, such as the front vehicle camera 24 of the vehicle 10 in FIG. 1.

At 408, the vehicle control module is configured to obtain vehicle error dynamics with respect to a specified target path. For example, the vehicle error dynamics may include one or more vehicle movement parameters with respect to the target vehicle path, such as a lateral movement parameter, a yaw rate parameter, a vehicle path offset parameter, etc.

At 412, the vehicle control module is configured to obtain vehicle plant model parameters. For example, a vehicle plant model may provide parameter values for modeling movement of the vehicle based on various conditions, constraints, etc. At 416, the vehicle control modules is configured to calculate a set of steering angle values along a finite horizon, based on the error states and a feedback control algorithm.

The vehicle control module is configured to determine a first path boundary at 420, based on steering angle values using a first gain value. Control then determines a second path boundary based on steering angle values at 424, using a second gain. In some examples, the first gain value may be larger than the second gain value. The first gain value may correspond to a most aggressive permissible steering angle to define a most aggressive permissible vehicle path boundary, while the second gain value may correspond to a least aggressive permissible steering angle to define a least aggressive vehicle path boundary (e.g., a most gradual steering change that completes the steering maneuver within a desired time period).

At 428, the vehicle control module is configured to generate a dynamically feasible vehicle path envelope based on the first and second boundaries. Control may then supply states of the dynamically feasible vehicle path as reference values for each output of a model predictive controller (MPC) output function, at 432.

Some example embodiments offer a cross-check between planning and control, in terms of feasibility of the merge path (e.g., a vehicle merge path for an automated lane merge). This cross-check may facilitate or guarantee feasibility, and constraints may therefore be accounted for at the system level. Additional computational effort to generate the feasible path envelope may be offset by reduced computational effort in an optimal control problem, when provided with a feasible path and a set of mutually achievable output states for tracking.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle control system for automated vehicle steering, the vehicle control system comprising:
an automated steering device configured to automatically adjust a steering angle of a vehicle;
at least one vehicle camera configured to capture an image of a front view from the vehicle; and
a vehicle control module configured to:
determine a vehicle merge path based at least in part on one or more images captured by the vehicle camera, the vehicle merge path configured to steer the vehicle to a specified target vehicle path;
obtain multiple vehicle error dynamic values with respect to the specified target vehicle path;
identify a first path boundary based on the multiple vehicle error dynamic values and a first steering gain parameter value;
identify a second path boundary based on the multiple vehicle error dynamic values and a second steering gain parameter value, wherein the second steering gain parameter value is less than the first steering gain parameter value;
determine a dynamically feasible vehicle path envelope according to the first path boundary and the second path boundary;
compare the vehicle merge path to the dynamically feasible vehicle path envelope; and
modify automated control of the steering angle of the vehicle in response to the vehicle merge path being outside of the dynamically feasible vehicle path envelope.

2. The vehicle control system of claim 1, wherein modifying automated control of the steering angle of the vehicle includes at least one of mechanically rotating a steering column of the vehicle and mechanically changing a steering orientation of wheels of the vehicle.

3. The vehicle control system of claim 1, wherein the vehicle control module is configured to maintain automated control of the steering angle of the vehicle along the vehicle merge path, in response to the vehicle merge path being inside of the dynamically feasible vehicle path envelope.

4. The vehicle control system of claim 1, wherein modifying automated control of the steering angle of the vehicle includes recalculating an updated vehicle merge path.

5. The vehicle control system of claim 1, wherein modifying automated control of the steering angle of the vehicle includes setting an updated vehicle merge path within the dynamically feasible vehicle path envelope.

6. The vehicle control system of claim 5, wherein the updated vehicle merge path is one of the first path boundary and the second path boundary.

7. The vehicle control system of claim 1, wherein the vehicle control module is configured to identify the first path boundary and the second path boundary based on calculation of a set of steering angle values along a finite horizon, according to the multiple vehicle error dynamic values.

8. The vehicle control system of claim 1, wherein the multiple vehicle error dynamic values include at least one of a vehicle lateral movement parameter, a vehicle yaw rate parameter, or a vehicle path offset parameter.

9. The vehicle control system of claim 1, wherein the vehicle control module is configured to execute at least one model predictive controller (MPC) objective function to control automated steering of the vehicle.

10. The vehicle control system of claim 1, wherein the vehicle control module is configured to supply states of the dynamically feasible vehicle path envelope to a model predictive controller (MPC) objective function.

11. The vehicle control system of claim 1, wherein the specified target vehicle path is a lane assist target path configured to control an automated lane merge of the vehicle.

12. A method of controlling automated vehicle steering, the method comprising:
determining a vehicle merge path of a vehicle based at least in part on one or more images captured by a vehicle camera, the vehicle merge path configured to steer the vehicle to a specified target vehicle path;
obtaining multiple vehicle error dynamic values with respect to the specified target vehicle path;
identifying a first path boundary based on the multiple vehicle error dynamic values and a first steering gain parameter value;
identifying a second path boundary based on the multiple vehicle error dynamic values and a second steering gain parameter value, wherein the second steering gain parameter value is less than the first steering gain parameter value;
determining a dynamically feasible vehicle path envelope according to the first path boundary and the second path boundary;
comparing the vehicle merge path to the dynamically feasible vehicle path envelope; and
modifying automated control of a steering angle of the vehicle in response to the vehicle merge path being outside of the dynamically feasible vehicle path envelope.

13. The method of claim 12, wherein modifying automated control of the steering angle of the vehicle includes at least one of mechanically rotating a steering column of the vehicle and mechanically changing a steering orientation of wheels of the vehicle.

14. The method of claim 12, further comprising maintaining automated control of the steering angle of the vehicle along the vehicle merge path, in response to the vehicle merge path being inside of the dynamically feasible vehicle path envelope.

15. The method of claim 12, wherein modifying automated control of the steering angle of the vehicle includes recalculating an updated vehicle merge path.

16. The method of claim 12, wherein modifying automated control of the steering angle of the vehicle includes setting an updated vehicle merge path within the dynamically feasible vehicle path envelope.

17. The method of claim 16, wherein the updated vehicle merge path is one of the first path boundary and the second path boundary.

18. The method of claim 12, wherein identification of the first path boundary and the second path boundary is based on calculation of a set of steering angle values along a finite horizon, according to the multiple vehicle error dynamic values.

19. The method of claim 12, wherein the multiple vehicle error dynamic values include at least one of a vehicle lateral movement parameter, a vehicle yaw rate parameter, or a vehicle path offset parameter.

20. The method of claim 12, further comprising executing at least one model predictive controller (MPC) objective function to control automated steering of the vehicle.

\* \* \* \* \*